United States Patent [19]

White

[11] Patent Number: 5,482,426

[45] Date of Patent: Jan. 9, 1996

[54] PALLET CHANGING METHOD

[76] Inventor: Gary L. White, 1825 Gentian, Grand Rapids, Mich. 49508

[21] Appl. No.: 274,601

[22] Filed: Jul. 13, 1994

[51] Int. Cl.$^6$ .................................................. B65G 67/00
[52] U.S. Cl. ........................ 414/786; 414/417; 414/608; 414/929
[58] Field of Search ..................................... 414/607, 608, 414/403, 417, 404, 786, 928, 922, 929, 799; 53/396, 393

[56] References Cited

U.S. PATENT DOCUMENTS

| | | | |
|---|---|---|---|
| 2,394,693 | 2/1946 | Golnck | 414/417 X |
| 2,412,155 | 12/1946 | Jessen | 414/417 |
| 2,451,226 | 10/1948 | Kemp, Jr. | 414/608 X |
| 2,574,394 | 11/1951 | Isler | 414/417 X |
| 3,645,409 | 2/1972 | Sinclair | 414/929 X |
| 5,118,243 | 6/1992 | Huebner et al. | 414/929 X |

FOREIGN PATENT DOCUMENTS 3443378  6/1985  Germany ................. 414/608

Primary Examiner—Frank E. Werner
Attorney, Agent, or Firm—Waters & Morse

[57] ABSTRACT

A method of changing a load supported by a first pallet to a second pallet comprises placing the first pallet supporting the load adjacent a stop member rigidly mounted on a floor surface, the stop member having an opening at a lower end sufficient for the pallet to slide under the stop member and having an abutting surface above the opening for engaging a side of the load on the first pallet. The first pallet is first positioned so that it has a rear edge facing the stop member opening and a front edge on an opposite side facing away from the stop member. A spacer member is placed under the front edge of the first pallet to raise the front edge of the first pallet above the level of the second pallet, the spacer member being moveable inwardly toward the stop member along with the first pallet. The second pallet is placed against the front edge of the first pallet and is slid toward the stop member while being positioned against the first pallet, such that the first pallet is forced under the stop member while the load is held in place, thus causing the load to be slidably transferred from the first pallet to the second pallet. The elevation of the front edge of the first pallet by the spacer facilitates sliding transfer of the load.

3 Claims, 2 Drawing Sheets

PALLET CHANGING METHOD

BACKGROUND OF THE INVENTION

This invention relates to an apparatus and method for transferring a load from one pallet to another pallet without unloading the pallet. More particularly, it relates to a pallet changer wherein the packages of a first pallet are held stationary while a second pallet is slid to replace the position of the first. Thereby, the packages of the first pallet are transferred to the second.

Pallets are used frequently to transport goods in bulk from one location to another. Conventionally, these pallets are made by nailing pieces of wood together to form a base. The base includes a floor contact surface, a package support surface, and a hollow interior into which the forks of a forklift truck may fit. The goods are then stacked upon the pallets. The goods may optionally be affixed to one another with a shrinkable or stretchable plastic film to provide stability.

Pallets supporting the packages or goods are usually stored in a warehouse for a short period of time before being loaded onto trucks or trains for transport. The packages are usually of varying weight and the pallets are made to support such variance. The pallets are reusable and are usually returned to their place of origin for reuse.

Due to the rough conditions found in such a bulk shipping environment, loaded pallets routinely become damaged. This may occur through dropping or contact with a wall or another pallet or a forklift truck. Occasionally, a pallet is burdened by an excessive load which causes breakage of the pallet. Changing pallets after they are loaded is time consuming. It requires manually unloading the broken pallet and manually restacking the products on a new pallet.

An object of the present invention is to provide a method, system and apparatus for efficiently transferring packages or goods supported by a first pallet to a second pallet without manually unloading and reloading the pallets.

These and other objects and advantages will become apparent from the following summary and description of a preferred embodiment of the invention taken together with the accompanying drawings.

SUMMARY OF THE INVENTION

Pallet changing apparatus for changing loads from a first pallet to a second pallet comprises a spacer, preferably a cylindrical rod, positioned between a front edge of the first pallet and the floor for raising the first pallet above the second; a base securely mounted to the floor and containing an opening for slidably receiving the first pallet therethrough; and a stop member supported above the base opening by the base for preventing lateral movement of the load when the first pallet is pushed through the base opening. To change a pallet by the method of the present invention, a forklift pushes the second pallet against the front edge of the first pallet allowing a rear edge of the first pallet to be received within the base opening. The stop member stops the load and causes the load to be transferred from the first pallet to the second pallet through contact with the stop member. The cylindrical rod rolls to the stop member along with the movement of the first pallet, thus keeping the front edge of the first pallet above the upper surface of the second pallet during the whole pallet changing operation.

DETAILED DESCRIPTION OF THE PREFERRED EMBODIMENT

Figure 1:
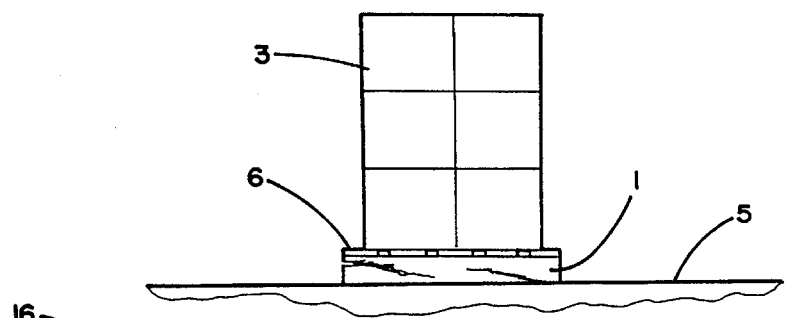
FIG. 1 is a side view of packages loaded on a broken pallet.

Referring to the drawings and more particularly to FIG. 1, a load of packages 3 is shown supported by a load supporting surface 6 of pallet 1. The pallet 1 is shown as a broken pallet in need of replacement and is resting on a floor surface 5.

To replace the pallet, pallet 1 supporting load 3 is first placed on cylindrical rod 7 in front of the base opening 23 of pallet changing mechanism 20. Next, the load is placed against stop member 17 of the pallet changing mechanism through manipulation of the first pallet. This may be accomplished manually but is preferably accomplished with the aid of a lift truck 16. A rear edge of pallet 1 faces the stop member at this point and a front edge faces away from the stop member. Additionally, the load may be snugly fit against the stop member 17 as it is placed on cylindrical rod 7. Next, the second pallet 11 is placed snug against the front edge of the first pallet in a position opposite to the base opening. The second pallet is moved laterally against the first pallet while being positioned on or at least right next to the floor. The second pallet is moved through the position shown in FIG. 3 as the load is slidably transferred from the first pallet to the second pallet through contact with the stop member. When the load has been completely transferred to the second pallet, the second pallet containing the load is removed from the pallet changer.

Figure 2:
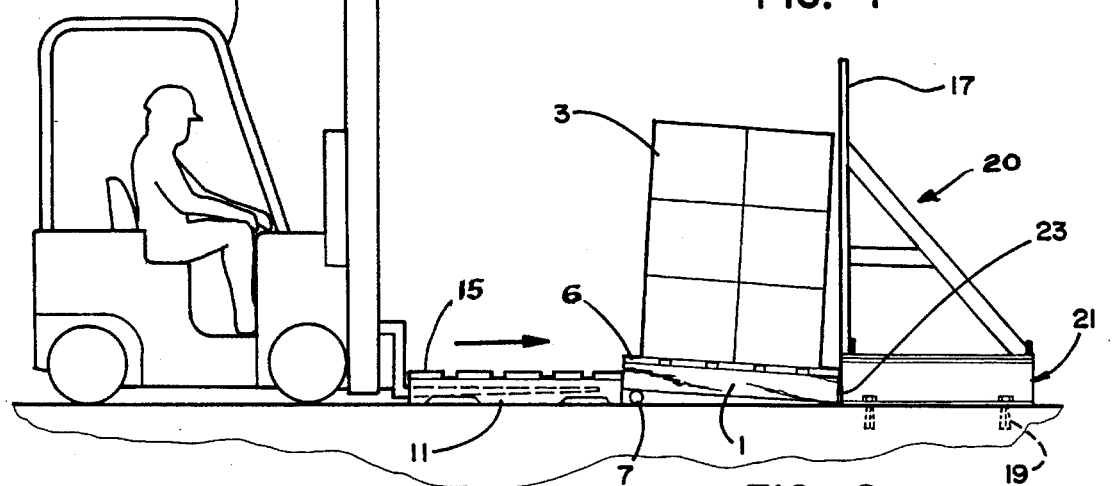
FIG. 2 is a side view of a broken pallet loaded on a rod and positioned in front of the pallet changing apparatus. A new pallet is positioned opposite to the pallet changing apparatus by a fork lift truck.

In reference to FIG. 2., pallet 1 is placed in front of pallet changing apparatus 20 with the front edge of the pallet being placed on top of cylindrical rod 7, which desirably is a one inch steel rod. Pallet changing apparatus 20 has a base 21 which supports the structure. The base 21 has a base opening 23 into which the pallet 1 may slidably fit during a lateral movement. The pallet changing apparatus 20 has a stop member 17 in the form of a flat vertical panel which contacts the entire side of a load of packages 3 during a pallet transfer. The pallet changing apparatus 20 is firmly secured to the floor through lag bolts 19. The load of packages 3 is supported underneath by load supporting surface 6.

A second pallet 11 is set next to pallet 1 and opposite to pallet changing apparatus 20. The second pallet 11 has a second load supporting surface 15. Due to the placement of cylindrical rod 7 below pallet 1, the load supporting surface 6 is raised slightly above the second load supporting surface 15. A truck 16 pushes second pallet 11 snug against pallet 1.

Figure 3:
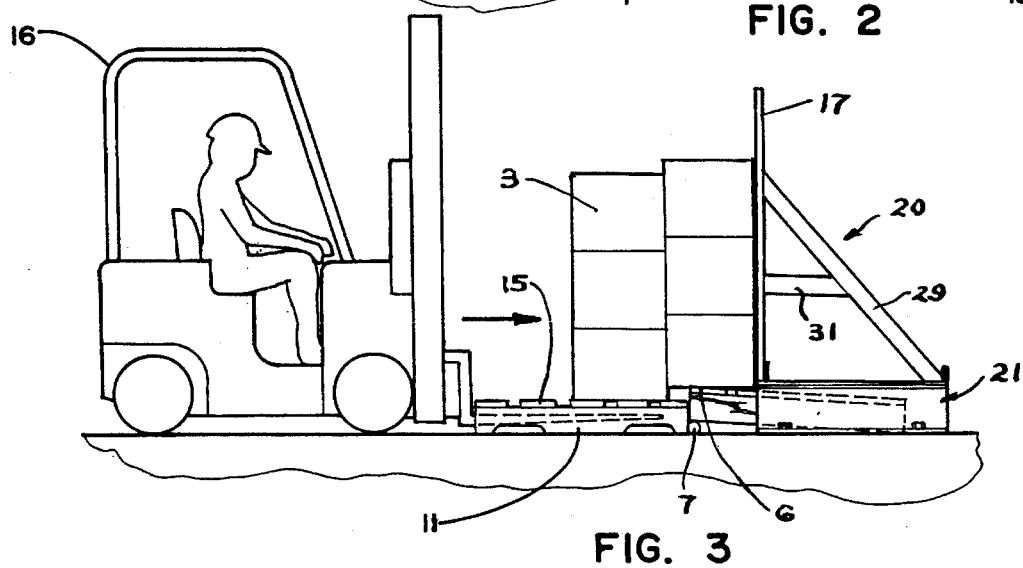
FIG. 3 is a side view of packages being transferred from the broken pallet to the new pallet.

FIG. 3 shows the truck 16 pushing the second pallet 11 into pallet 1. Pallet 1 is then displaced into base opening 23 of base 21. The load of packages 3 is held in place during the lateral movement of pallet 1 by the stop member 17. The front edge of load supporting surface 6 continually resides above the second load supporting surface 15 during the lateral movement due to cylindrical rod 7. Second pallet 11 holds cylindrical rod 7 below pallet 1 through contact with pallet 1 during lateral movement, as the rod rolls along under the front edge of the first pallet all the way to the stop member. Because load supporting surface 6 is continually above second load supporting surface 15, load 3 is easily transferred from pallet 1 to second pallet 11.

After the load 3 has been completely transferred from pallet 1 to second pallet 11, pallet 1 resides directly underneath pallet changing apparatus 20. Now free from load 3, pallet 1 can be easily removed.

Figure 4:
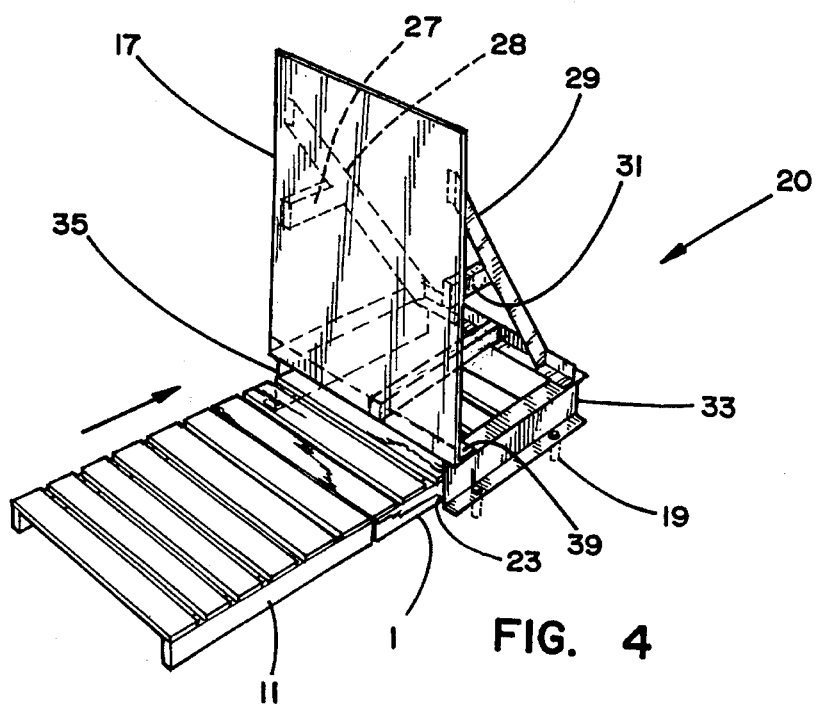
FIG. 4 is a perspective drawing showing the broken pallet partially inserted into the pallet changing apparatus.
Figure 5:
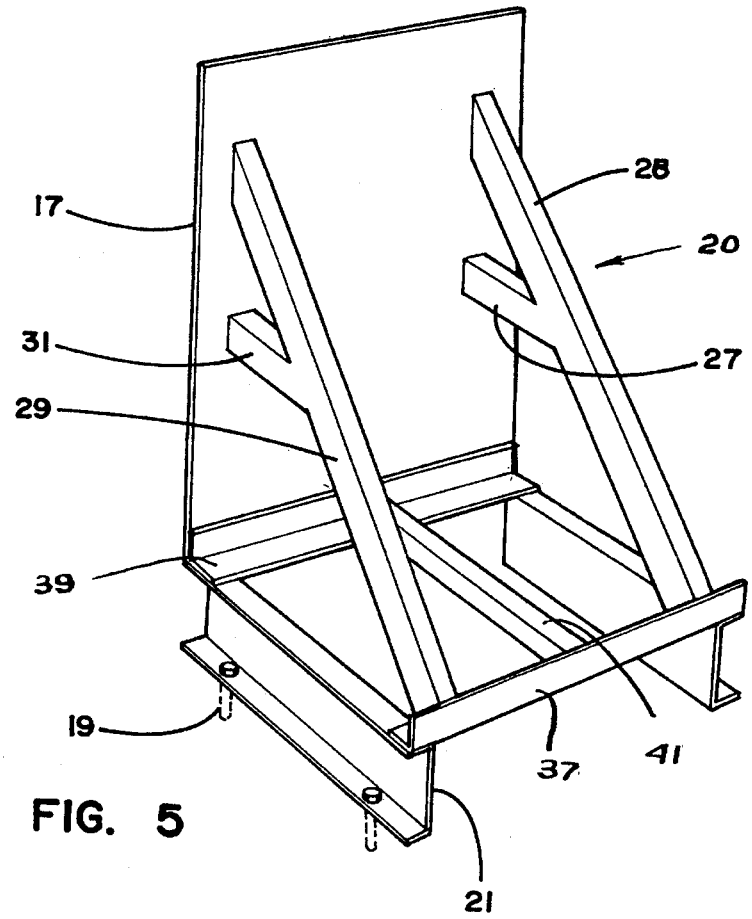
FIG. 5 is a perspective drawing showing lateral and diagonal support to the stop member from the base.

FIGS. 4 and 5 show the invention from a perspective viewpoint. The stop member 17 is firmly secured by diagonal member 28. A second diagonal member 29 is also used to provide additional support. Lateral member 27 additionally secures stop member 17 to diagonal member 28. Likewise, lateral member 31 additionally secures stop member 17 to diagonal member 29. FIG. 4 is shown with load 3 removed to provide a more detailed perspective of pallet changing apparatus 20.

The base 21 includes two side support members 33 and 35, each in the form of an outwardly facing C-shaped channel member. The side support members are spaced a distance apart which is greater than the width of a standard pallet and are secured to the floor with two lag bolts 19 each. This allows the pallet 1 to pass between the side supports. Connected to side support members 33 and 35 are two cross support members 37 and 39. Cross support 39 abuts a bottom portion of stop member 17 while cross support member 37 provides a connection from the diagonal members to the side support members. Both cross support members 37 and 39 connect to the side support members at a distance from the floor greater than a standard pallet height. This allows the pallet 1 to pass underneath the cross support members during a lateral movement.

FIG. 5 is another perspective view of the pallet changing apparatus 20 with both pallets removed from view. A rigid brace member 41 is shown connecting the two cross support members to thereby strengthen the rigidity of the apparatus.

It should be understood that the foregoing is merely exemplary of the preferred practice of the present invention and that various changes may be made in the arrangements and details of construction of the embodiments disclosed herein without departing from the spirit and scope of the present invention, which is defined in the appended claims.

I claim:

1. A method of changing a load supported by a first pallet to a second pallet, wherein each pallet comprises a raised load supporting surface spaced above a floor engaging lower surface, the method comprising:

placing the first pallet supporting the load adjacent a stop member rigidly mounted on a floor surface, the stop member having an opening at a lower end sufficient for a pallet to slide under the stop member and extending upwardly therefrom to form an abutting surface for engaging a side of the load on the first pallet, the first pallet being positioned so that it has a rear edge facing the stop member and a front edge on an opposite side facing away from the stop member;

placing a spacer member is placed under the front edge of the first pallet to raise the front edge of the first pallet above a level of the second pallet, the spacer member being moveable inwardly toward the stop member along with the first pallet;

placing the second pallet against the front edge of the first pallet;

sliding the second pallet toward the stop member while being positioned against the first pallet, such that the first pallet is forced under the stop member while the load is held in place, thus causing the load to be slidably transferred from the first pallet to the second pallet, with the elevation of the front edge of the first pallet by the spacer facilitating sliding transfer of the load, the spacer being moved inwardly to the stop member along with the first pallet to maintain a continued elevation of the front edge of the first pallet with respect to the second pallet as the load is changed from the first to the second pallet.

2. The method according to claim 1 wherein the spacer is a cylindrical rod that rolls toward the stop member as the first pallet is forced under the stop member.

3. The method according to claim 2 wherein a diameter of the rod is about one inch.

\* \* \* \* \*